United States Patent [19]

Raymond et al.

[11] 3,808,469

[45] Apr. 30, 1974

[54] TEMPERATURE COMPENSATION CIRCUIT FOR SENSOR OF PHYSICAL VARIABLES SUCH AS TEMPERATURE AND PRESSURE

[75] Inventors: William R. Raymond, W. Covina; Frank K. Haag, San Gabriel; Pal Andre La Claire, Claremont, all of Calif.

[73] Assignee: Bell & Howell Company, Chicago, Ill.

[22] Filed: Oct. 27, 1972

[21] Appl. No.: 301,605

[52] U.S. Cl. .............. 307/308, 307/310, 73/362 SC, 323/68, 219/504, 219/505

[51] Int. Cl. .............. H03k 23/22

[58] Field of Search .............. 307/278, 310, 308; 73/362 SC, 362 AR; 323/68, 69; 219/491, 494, 501, 504, 505

[56] References Cited

UNITED STATES PATENTS

| | | | |
|---|---|---|---|
| 3,022,457 | 2/1962 | Doan | 323/68 |
| 3,067,613 | 12/1962 | Rasmussen | 73/362 AR |
| 3,489,881 | 1/1970 | Chambers | 219/501 |
| 3,154,947 | 11/1964 | Poshadel et al. | 73/326 AR |
| 3,440,883 | 4/1969 | Lightner | 73/362 SC |

*Primary Examiner*—Andrew J. James

*Attorney, Agent, or Firm*—Christie, Parker & Hale

[57] ABSTRACT

A temperature compensation circuit for sensors of physical variables such as temperature and pressure, which sensors have an overall negative temperature coefficient, employs a plurality of diodes connected in series to the sensor. An excess number of diodes are connected in the circuit to give the diodes and transducer in series an overall positive temperature coefficient of sensitivity. A positive temperature coefficient resistor is also connected in series with the diodes and transducer. A low temperature coefficient resistor is connected in series in conjunction with the positive temperature coefficient resistor.

Alternatively, a first low temperature coefficient resistor is connected in series with the plurality of diodes and the transducer to the source of excitation voltage. A second low temperature coefficient resistor is connected across the series combination of the diodes and the transducer.

11 Claims, 5 Drawing Figures

Es
12
17
16
14
10
Eo
Ex
11
13

20
21

Re
25
26

31
32
34
30
35

Ee
36
37

TEMPERATURE COMPENSATION CIRCUIT FOR SENSOR OF PHYSICAL VARIABLES SUCH AS TEMPERATURE AND PRESSURE

BACKGROUND OF THE INVENTION

1. Field of the Invention

This invention relates to a temperature compensation circuit that is particularly useful in compensating for changes in ambient temperature of pressure and temperature sensors. Sensors generally have a thermal response such that operation at a temperature other than that at which the sensor has been calibrated results in an error in the output of the sensor. For example, strain gages are often employed in a pressure sensor where the medium communicating with the gages is a liquid which has a temperature different from that at which the gages and resultant sensor were calibrated.

2. Description of the Prior Art

Various methods and apparatus have been employed in the past to compensate for the thermal responsiveness of sensors. For example, where the gages have a positive or negative temperature coefficient, a wire wound resistor having the same temperature coefficient and as close to the same thermal slope or resistance variation with respect to temperature as possible was connected in series with the gages. However, these wire wound resistors have a tendency to break due to the differences in thermal expansion rates of the resistors and the conformal coating used to hold them in place. Consequently these wire wound resistors tend to be unreliable. Alternatively, thermistors have been employed in compensation circuits but the thermistors exhibit a nonlinear temperature coefficient that is not compatible with the thermal slope of the sensors to be compensated. Moreover, the temperature compensation circuits are generally useful with only one specific sensor requiring a specific amount of compensation at a particular temperature which severely limits the usefulness of these compensation circuits.

A plurality of diodes may also be employed for the thermal compensation of transducers having an overall negative temperature coefficient. However, these diodes provide only a coarse adjustment for the thermal compensation. Consequently, a variable source of excitation voltage may be required in conjunction with the diodes to provide a flat thermal response for the sensor. However, any variation in voltage may introduce error by disturbing the calibration of the sensor.

SUMMARY OF THE INVENTION

The disadvantages of these thermal compensation methods are overcome in accordance with this invention. The compensation circuit for transducers having an overall negative temperature coefficient comprises a plurality of diodes connected in series between the transducer and the source of excitation voltage for the transducer. The diodes are sufficient in number to provide an overall positive temperature coefficient for the combination of the diodes and transducer. The compensation circuit also includes a positive temperature coefficient resistor in series between the series connection of the diode and transducer and the source of excitation voltage. Additionally, a low temperature coefficient resistor is connected in the series circuit to provide standardization for the overall transducer and compensation circuit.

Alternatively, the positive temperature coefficient resistor and low temperature coefficient resistor may be replaced by two low temperature coefficient resistors with the first resistor being connected in series between the source of excitation voltage and the series combination of diodes and transducers. The second resistor is connected in parallel with the series combination of the diodes and the transducer. The parallel resistance of the two resistors as seen across the series combination is selected to provide a flat thermal response for the transducer. Additionally, the ratio of the resistance of the second resistor to the sum of the resistances of the two resistors is selected to provide standardization of the output voltage of the transducer having a given excitation voltage.

For a transducer having positive temperature coefficient of bridge resistance greater than the negative temperature coefficient of the gage factor the compensation circuit of this invention includes two low temperature coefficient resistors with the first resistor connected between the transducer and voltage source and the second resistor connected directly across the transducer. The parallel resistance of the two resistors as seen at the input to the transducer is selected so that the transducer will have a flat thermal response. The ratio of the resistance of the second resistor to the resistance of the two resistors combined is selected to provide standardization.

BRIEF DESCRIPTION OF THE DRAWINGS

These and other features and advantages of the invention may be understood more fully and clearly upon consideration of the following specification and drawings, in which.

DESCRIPTION OF THE PREFERRED EMBODIMENT

Figures 1, 2, 3, 4, 5:
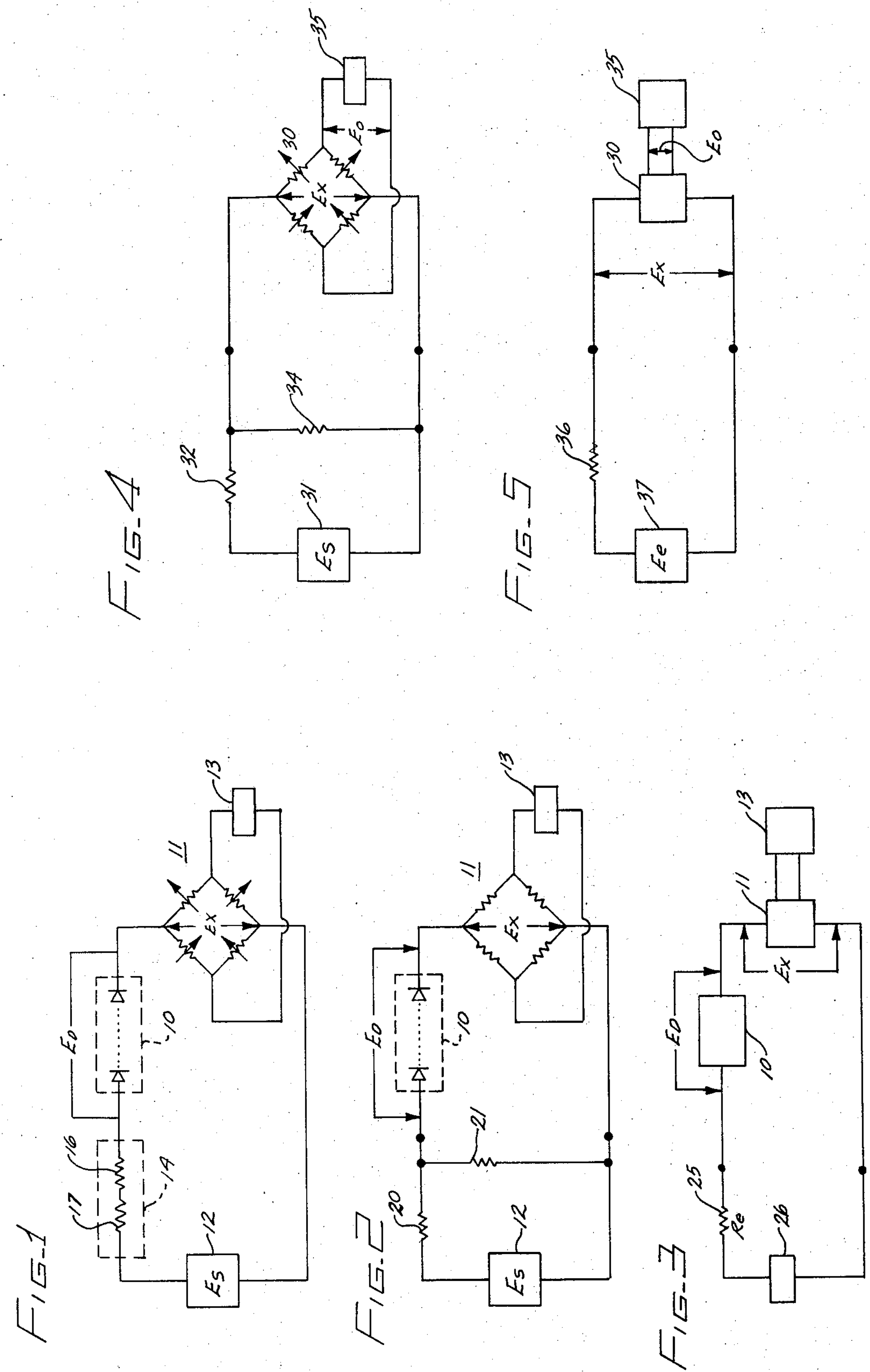
FIG. 1 is a schematic diagram of a temperature compensation circuit for a transducer having an overall negative temperature coefficient in accordance with the present invention.
FIG. 2 is a schematic diagram of an alternative embodiment of the temperature compensation circuit of the present invention.
FIG. 3 is a schematic diagram of an equivalent circuit for the circuit of FIG. 2.
FIG. 4 is a schematic diagram of a temperature compensation circuit for a transducer having an overall positive temperature coefficient.
FIG. 5 is a schematic diagram of an equivalent circuit for the circuit of FIG. 4.

The temperature compensation circuit of the present invention is useful in compensating for errors in the output of a sensor or transducer due to variations in ambient temperature. The transducers schematically depicted in FIGS. 1, 2 and 4 include a bridge circuit configuration of four elements or strain gages which is representative of the typical semiconductor type transducer. Semiconductor type transducers generally have an overall negative temperature coefficient as a result of the gage factor having a greater influence on the output voltage than does the resistance of the transducer. Consequently any compensation device must cause an increase in the voltage applied to the transducer to overcome the decrease in output voltage caused by the negative going gage factor for temperature increases.

As seen in FIG. 1, a plurality of diodes 10 are connected in series between a sensor or transducer 11 and a source of excitation voltage 12. The diodes 10 are sufficient in number to result in an overall positive temperature coefficient for the transducer device, including the diodes. Thereafter, more precise compensation is provided by employing a resistive network 14 in conjunction with the diodes 10.

The diodes 10 and resistive network 14 are connected in series between the transducer 11 and the source of voltage 12. With the overall effect of the diodes being to effect a positive temperature coefficient, the resistive network 14 has a positive temperature coefficient to compensate for the overall positive temperature coefficient of the diodes 10 and transducer 11. The resistive network 14 includes a first resistor 16 that has a positive temperature coefficient and a second resistor 17 which has a low temperature coefficient. Resistor 16 is selected to render the transducer device insensitive to changes in temperature. The resistance of the second resistor 17 in combination with the resistance of the first resistor 16 is selected to provide standardization of the output voltage of the transducer having a given excitation voltage.

The output of the transducer 11 is connected to a utilization means 13 which may be a means for recording the output voltage of the transducer and relating it to an input variable such as pressure as is typically done with strain gages.

The device resulting from the addition of diodes 10 and resistive network 14 to the transducer 11 has an essentially flat thermal response across the normal temperature range of operation.

The number of diodes required for a given transducer can be calculated by solving the quadratic equation.

$$n^2+n\left\{\frac{E_x[k_Bk_G(k_D+1)-2]-\frac{E_{01}}{G_1}(k_{B-1})}{V_{D1}(1-k_Bk_Dk_G)}\right\}+\frac{E_x}{V_{D_1}{}^2(1-k_Bk_Dk_G)}\left[\frac{E_{0_1}}{G_1}(k_B-1)+E_x(1-k_Bk_G)\right]=0$$

where subscripts:

1 and 2 refer to temperature points
$B$ refers to sensor bridge
$D$ refers to diode
$G$ refers to sensitivity of sensor and $E_X$ = Excitation (volts)
$E_o$ = Full scale output (volts)
$G_1$ = Sensitivity (volts per unit of sensed variable)
$V_D$ = Diode junction voltage (volts)
$k = 1 + (TC_X)(\Delta T)$
$TC = X$ at $T_0 - X$ at $T_1/X$ at $T_1$ $\Delta T$
$T$ = Temperature The solution for $n$ will result in a real number that will cause the sensitivity at two temperature points to be equal. Since $n$ in reality can only be an integer (discrete number of diodes) the solution is raised to the next highest integer which results in a positive TC of sensitivity.

The values for the positive temperature coefficient resistor, $R_{16}$, and the low temperature coefficient resistor, $R_{17}$, can be calculated by the following equations:

$R_{16} = (E_x - nV_{D_1} k_o)(R_{B_1} + R_S)k_Bk_G - (E_x - nV_{D_1})(R_{B_1} 09k_B + R_S)/(E_x - nV_{D_1})(k_{16} - 1)$ $R_S = R_{B_1} [(E_x - nV_{D_1}) G_1/E_{01} - 1]$ $R_{17} = R_S = R_{16}$ where $R_B$ = Bridge Resistance
$R_S = R_{16} + R_{17}$ In the production of any device it is desirable that the device be producible by automatic means if possible. However, in the temperature compensation circuit of FIG. 1, the resistance value of resistor 16 having the positive temperature coefficient is generally variable only by physically substituting a different resistor. Consequently, the circuit of FIG. 1 is not readily amenable to automatic production. An alternative temperature compensation circuit of the present invention which may be produced by automatic means is shown schematically in FIG. 2 with the equivalent circuit thereof being shown schematically in FIG. 3. In this temperature compensation circuit, diodes 10 are again coupled to the input of transducer 11, with the number of diodes being selected to provide an overall positive temperature coefficient for the diodes 10 and transducer 11. The output of the transducer is coupled to a utilization means 13, with a source 12 providing the excitation voltage for the transducer.

In the temperature compensation circuit of FIG. 2, only low temperature coefficient resistors are employed, thereby eliminating the need for the relatively expensive positive temperature coefficient resistor 16 of FIG. 1. In the temperature compensation circuit of FIG. 2, a first resistor 20 is connected between the source 12 and the diodes 10. A second resistor 21 is connected across the series combination of diodes 10 and transducer 11. Advantageously, the resistors 20 and 21 have a low temperature coefficient.

Referring to the equivalent circuit in FIG. 3 of the temperature compensation circuit of FIG. 2, the parallel resistance of the resistors 20 and 21 that appears across the series combination of diode 10 and transducer 11 is represented by a single resistor 25. The value of this resistance is selected to provide the exact thermal compensation for the transducer 11 and its associated diodes 10. The effect of the change in junction voltage of the diodes 10 with a change in temperature as felt across the input to the transducer 11 is determined by the ratio of the transducer bridge resistance to the resistance of the resistor 25.

The resistance of resistor 25 is equal to the resistance of resistors 20 and 21 in parallel. Additionally, in the equivalent circuit, the source of excitation voltage 12 is replaced by a source of voltage as seen across the series combination of diodes 10 and transducer 11 when there is a given source of excitation voltage and with resistors 20 and 21 in place.

The resistance value of the equivalent resistor 25 is determined by solving the following:

$R_{25}{}^2 + R_{25}(R_B/1 - k_Bk_G)\{[1 - k_B(2k_G - 1)] - n^V{}_BGk_G/E_o [k_B(1 - k_D)]\}$ $-R_B{}^2 (k_B/1 - k_Bk_G)[(k_G - 1) + n V_BGk_G(1 - k_D)] = 0$ where, subscript $B$ — refers to the sensor or transducer bridge;
$D$ — refers to the diodes;
$G$ — refers to the sensitivity of the transducer; and where
$k = 1 + (TC)\,\Delta t$
$TC$ = temperature coefficient of the elements
$E_o$ = Full scale output voltage
$V_D$ = Diode junction voltage
$T$ = Temperature The voltage at the output of equivalent source 26 is selected to provide calibration or output standardization at a given temperature and is equal to the excitation voltage times the ratio of the resistance of resistor 21 to the total resistance of resistors 20 and 21 in series. After determining the value of the equivalent resistance and the value of the output voltage of source 26, the resistances of the individual resistors 20 and 21 may be calculated by the following equations:

$$R_{20} = R_{25}\,E_x/E$$

$$R_{21} = R_{25}\,E_x/E_x{-}E$$

where $E_x$ = excitation voltage at the output of source 12 and $E = (R_{25}/R_B + 1)\,E_o/G + n^V{}_B$ and
$n$ = the number of diodes in the diode network 10.

Advantageously, the resistors 20 and 21 may be thick or thin film resistors so that the resistance value thereof may be adjusted automatically by abrasively removing a part of the film. The difficulty that may be encountered with the circuit of FIG. 1 of hand soldering different positive temperature coefficient resistors in place to get the correct valued resistor, is thus avoided.

In cases where the transducer has a positive temperature coefficient, which may occur in semi-conductor strain gages having a high doping level, the temperature compensation circuit shown schematically in FIG. 4 with the equivalent circuit therefor shown schematically in FIG. 5 is useful. Where the transducer has a positive temperature coefficient it is only necessary to employ resistors to decrease the voltage applied to the transducer as a function of temperature to create a flat thermal response.

A first resistor 32 having a low temperature coefficient is connected between a source of excitation voltage 31 and a transducer 30. A second resistor 34 is connected across the input terminals of the transducer 30.

The resistance of resistors 32 and 34 may be considered to be a part of the source resistance as seen from the input terminals of the transducer 30. If the transducer was excited by a constant current source which effectively has infinite resistance as far as the load is concerned, the voltage across the transducer bridge would simply be the current from the source times the bridge resistance. As a consequence, as the temperature increases the voltage across the bridge would increase as a direct function of the bridge resistance. On the other hand, as the transducer is excited by a constant voltage source which effectively has zero resistance as far as the load is concerned, then the transducer bridge voltage would not change with temperature. Somewhere between the current source case and the voltage source case, there is a value of effective source resistance at which the increase in bridge voltage due to the presence of this resistance will exactly offset the decrease in gage factor of the transducer and result in zero change of sensitivity with temperature.

This resistance is represented by resistor 36 in FIG. 5. The resistance value of this equivalent resistor 36 for resistors 32 and 34 is equal to the parallel resistance of resistors 32 and 34 and may be calculated by the following equation:

$$R_{36} = R_{32}R_{34}/R_{32}{+}R_{34} = R_B\,(k_B - 1)k_B/1 + k_G\,(k_B - 2)$$

where the subscript
$B$ refers to the transducer bridge;
$G$ refers to the sensitivity of the transducer; and
$k = 1 + (TC)\,\Delta\,t$
$TC$ = the temperature coefficient of the device
$T$ = Temperature.

Additionally, the equivalent circuit excitation voltage as represented by the source 37 in FIG. 5 is selected to provide room temperature calibration or standardization and may be determined from the following equation:

$$E_{37} = E_x\,R_{34}/R_{32}{+}R_{34} = E_o/G\,(R_B + R_{37}/R_B)$$

Where
$E_x$ = excitation voltage
$E_o$ = output voltage of the transducer
$G$ = sensitivity of the transducer.

From these two equations the resistance values for resistors 32 and 34 may be calculated by the simultaneous solution thereof.

Various changes or modifications may be made in the details of construction without departing from the spirit and scope of the invention as defined by the appended claims.

What is claimed is:

1. In combination,
a transducer for converting changes in a physical variable to an electrical signal,
the transducer having an overall negative temperature coefficient that causes an error in the output at temperatures other than that at which the transducer is calibrated; and
a compensation circuit including a first resistor and a second resistor connected in series, and
a plurality of diodes having a negative temperature coefficient connected in series with the first and second resistors between the transducer and the source of excitation voltage for the transducer.

2. The combination in accordance with claim 1 wherein the increase in output voltage caused by the negative temperature coefficient of the plurality of diodes is greater than the decrease in output voltage caused by the overall negative coefficient of the transducer.

3. The combination in accordance with claim 2 wherein the first resistor has a positive temperature coefficient and causes a decrease in the output voltage from the transducer related to the difference between the increase in output voltage caused by the plurality of diodes and the decrease in output voltage caused by the overall negative temperature coefficient of the transducer with an increase in temperature.

4. The combination in accordance with claim 3 wherein the resistance of the second resistor in combination with the resistance of the first resistor provides a desired output voltage from the transducer for a given change in the monitored physical variable for a selected source voltage.

5. A temperature compensated pressure sensor comprising a semiconductor transducer having four elements connected in a bridge circuit configuration and having an overall negative temperature coefficient;

a source of excitation voltage for the transducer; and a temperature compensation circuit connected between the source and the transducer, the compensation circuit including a plurality of diodes having a negative temperature coefficient in series with a first resistor having a positive temperature coefficient and a second resistor having a low temperature coefficient.

6. In combination, a transducer for converting changes in a physical variable to an electrical signal, the transducer having an overall negative temperature coefficient that causes an error in the output at temperatures other than that at which the transducer is calibrated, and a compensation circuit including a plurality of diodes having a negative temperature coefficient connected in series to one input terminal of the transducer, a first resistor having a low temperature coefficient connected in series with the diodes between the transducer and a source of excitation voltage, and a second resistor having a low temperature coefficient connected in parallel with the diodes and transducer.

7. The combination in accordance with claim 6 wherein the total resistance of the first and second resistors in parallel combination as seen by the transducer is related to the resistance of the transducer to provide thermal sensitivity compensation.

8. The combination in accordance with claim 6 wherein the ratio of the resistance of the second resistor to the total resistance of the first and second resistors in series combination is selected to provide a desired output voltage for a given source voltage.

9. A temperature compensated pressure sensor comprising a semiconductor transducer having four elements connected in a bridge circuit configuration and having an overall negative temperature coefficient, a source of excitation voltage, and a temperature compensation circuit including a plurality of diodes connected in series and a first resistor connected in series with the diodes between the source and the transducer, and a second resistor connected across the series combination of the diodes and the transducer, the number of diodes being sufficient to cause the resultant increase in output voltage with increase in temperature to be greater than the decrease in output voltage with increasing temperature caused by the negative temperature coefficient of the transducer.

10. In combination, a transducer for converting changes in a physical variable to an electrical signal, the transducer having an overall positive temperature coefficient that causes an error in the output at temperatures other than that at which the transducer is calibrated, and a compensation circuit including a first resistor having a low temperature coefficient connected between the transducer and a source of excitation for the transducer, and a second resistor having a low temperature coefficient connected across the transducer.

11. The combination in accordance with claim 10 wherein the total resistance of the first and second resistors in parallel combination is related to the resistance of the transducer to provide zero change in the sensitivity of the transducer with changes in temperature.

* * * * *

0-1050
(5/69)

UNITED STATES PATENT OFFICE
CERTIFICATE OF CORRECTION

Patent No. 3,808,469 Dated April 30, 1974

Inventor(s) Raymond et al

It is certified that error appears in the above-identified patent and that said Letters Patent are hereby corrected as shown below:

In the specification, Column 2, line 67, after "increases." insert new paragraph:

-- Semiconductor diodes having a negative temperature coefficient connected between the source of excitation and the transducer perform this function. An increase in temperature results in a lower voltage drop across the diodes so that a higher voltage is available at the transducer. --

Column 4, line 7, that portion of the equation reading "$R_{B_1}$ 09$k_B$+$R_S$)" should read -- ($R_{B_1} k_B + R_S$) --. Line 10, that portion of the equation reading "$R_S = R_{16}$" should read -- $R_S - R_{16}$ --. Line 66, that portion of the equation reading " + n $V_B G k_G (1-k_D)$] " should read -- $+ \frac{n V_B G k_G}{E_O}(1-k_D)]$ --.

Column 5, line 58, delete "as" and insert -- if --.

Column 6, line 7, delete the equation and substitute the following:

$$-- R36 = \frac{R32 \quad R34}{R32 + R34} = \frac{R_B \ (k_B - 1) \ k_B}{k_G \quad k_B - 1} --$$

Signed and sealed this 17th day of September 1974.

(SEAL)
Attest:

McCOY M. GIBSON JR.
Attesting Officer

C. MRSHALL DANN
Commissioner of Patents